United States Patent
Anubhai et al.

(10) Patent No.: US 12,026,203 B1
(45) Date of Patent: Jul. 2, 2024

(54) KNOWLEDGE GRAPH ALIGNMENT

(71) Applicant: Amazon Technologies, Inc., Seattle, WA (US)

(72) Inventors: Rishita Rajal Anubhai, Seattle, WA (US); V. Divya Bhargavi, Atlanta, GA (US); Vidya Sagar Ravipati, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/935,442

(22) Filed: Sep. 26, 2022

(51) Int. Cl.
  *G06F 17/00* (2019.01)
  *G06F 16/901* (2019.01)
(52) U.S. Cl.
  CPC .................. *G06F 16/9024* (2019.01)
(58) Field of Classification Search
  CPC .................................................. G06F 16/9024
  See application file for complete search history.

(56) References Cited

U.S. PATENT DOCUMENTS

| | | | | |
|---|---|---|---|---|
| 11,494,665 B2* | 11/2022 | Crabtree | ............ | G06F 16/2272 |
| 2019/0354887 A1* | 11/2019 | Subramanian | ...... | G06F 16/9024 |
| 2020/0134477 A1* | 4/2020 | Lee | ........................ | G06N 5/022 |
| 2021/0049478 A1* | 2/2021 | Zhu | .......................... | G06N 3/08 |
| 2021/0103706 A1* | 4/2021 | Yu | ............................ | G06F 40/44 |
| 2021/0279599 A1* | 9/2021 | Carbune | ................ | G06F 40/35 |
| 2022/0230625 A1* | 7/2022 | Zhu | ..................... | G06F 18/2155 |

OTHER PUBLICATIONS

Shichao Pei et al., Semi-Supervised Entity Alignment via Knowledge Graph Embedding with Awareness of Degree Difference. In The World Wide Web Conference, Association for Computing Machinery, 3130-3136. <https://doi.org/10.1145/33>, May 2019.*
Jiaojian Kang et al., Learning Rule Embeddings over Knowledge Graphs: A Case Study from E-Commerce Entity Alignment. In Companion Proceedings of the Web Conference 2020. Association for Computing Machinery, USA, 854-855. <https://doi.org/10.1145/3366424.3382710>, Apr. 2020.*
Kexuan Xin et al., Informed Multi-context Entity Alignment. In Proceedings of the Fifteenth ACM International Conference on Web Search and Data Mining. Association for Computing Machinery, 1197-1205. <https://doi.org/10.1145/3488560.3498523>, Feb. 2022.*

* cited by examiner

*Primary Examiner* — Greta L Robinson
(74) *Attorney, Agent, or Firm* — Nicholson DeVos Webster & Elliott LLP

(57) ABSTRACT

Techniques for aligning (merging) knowledge graphs is described. Graph entity alignment is the problem of "joining" two knowledge graphs based on common entities. Most approaches in literature solve this using some annotated seed entity pairs and train a supervised model to rank entities in one knowledge base against another. In some examples, unsupervised alignment approach that uses graph-to-text summaries to encode entities in two or more distinct graphs into the same representation space, encodes those summaries into a common space, and then uses similarity analysis to determine when graph entities should be aligned (merged).

20 Claims, 10 Drawing Sheets

| BOOK TITLE | AUTHOR | GENRE | YEAR | PUBLISHER | KEYWORDS |
|---|---|---|---|---|---|
| NATURAL DISASTERS | JIM SMITH | NON-FICTION | 2022 | BOOKPUB, INC. | EARTHQUAKES, MUDSLIDES, HURRICANES, TORNADOES, BLIZZARDS, DROUGHT |

KG 1 ENTITY 201

| WRITER | TITLE | TYPE OF BOOK | YEAR | TAGS |
|---|---|---|---|---|
| SMITH, JIM | NATURAL DISASTERS | NON-FICTION | 2022 | SAN FRANCISCO EARTHQUAKE, KATRINA, FEMA, MINNESOTA, LAKE MEAD, CROPS, INSURANCE COVERAGE, FOREST FIRES |

KG 2 ENTITY 203

| WRITER | TITLE | TYPE OF BOOK | YEAR | TAGS |
|---|---|---|---|---|
| JONES, STEVE | A WOBBLY DISASTER | FICTION | 2020 | ENTREPRENEUR, FAILED BUSINESS, EVERYDAY BOBBLEHEADS |

KG 2 ENTITY 205

*FIG. 2*

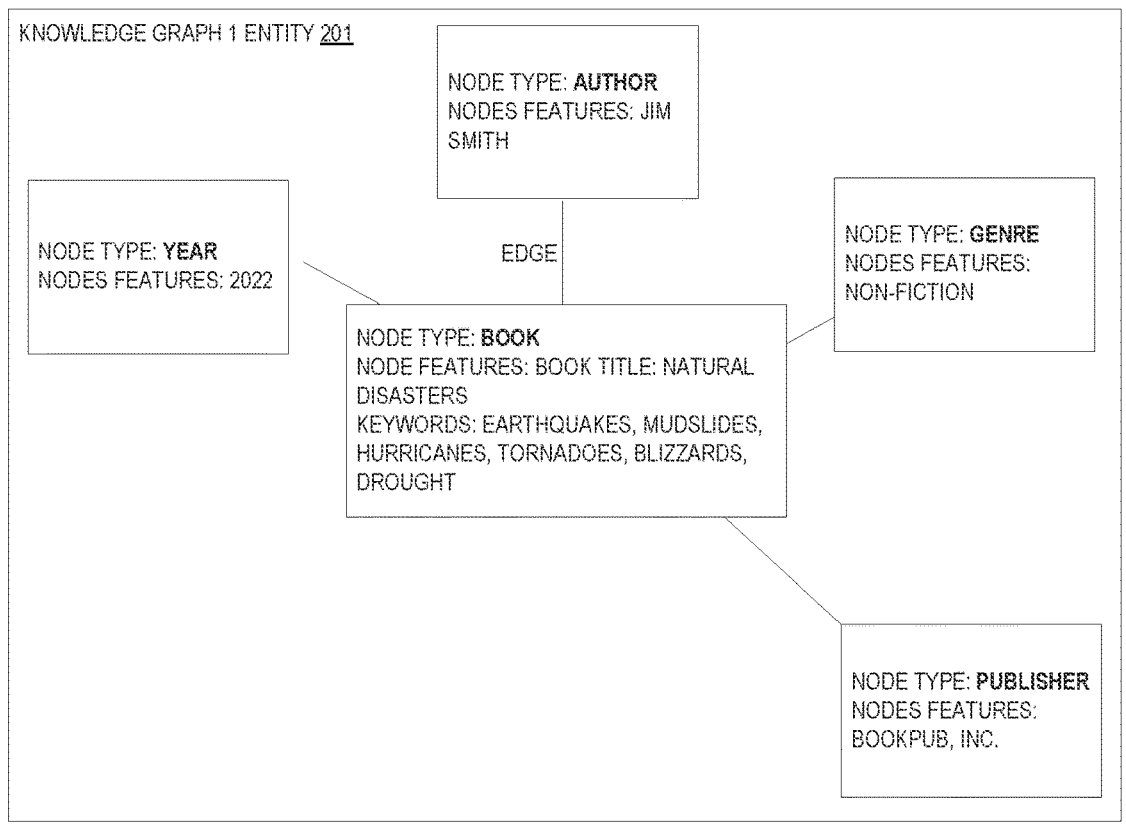
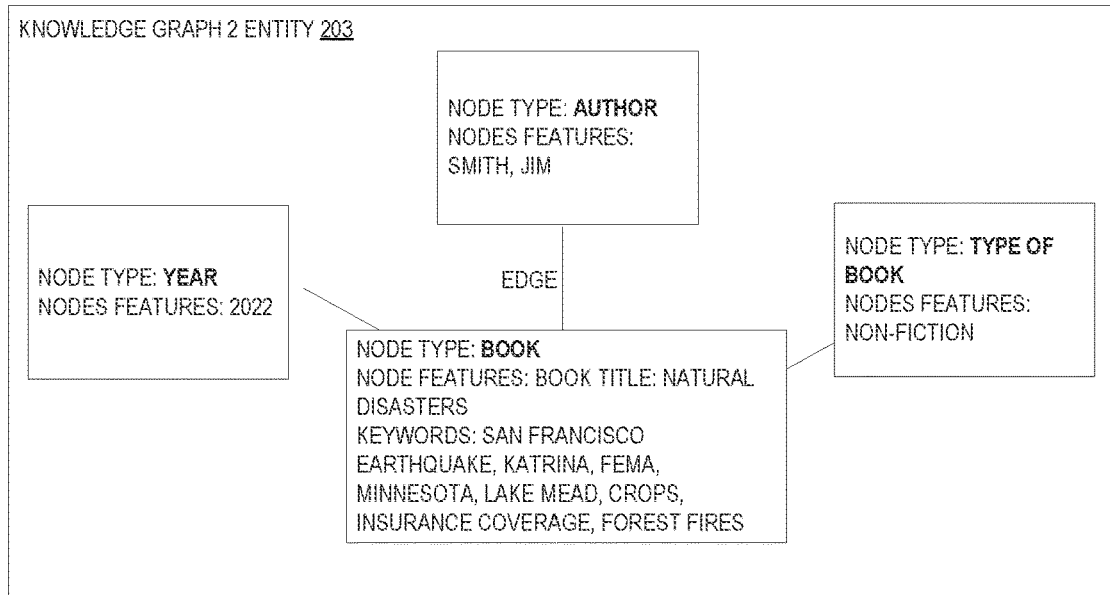
*FIG. 3*

KNOWLEDGE GRAPH ALIGNMENT

BACKGROUND

A knowledge graph (KG) structures and organizes information for easier access and understanding. Graphs are a natural way to model and represent information about the world. Unlike traditional ways of managing data, such as relational databases, graph modeling is very flexible and allows for the real-world diversity and heterogeneity of data.

A knowledge graph captures the semantics of a particular domain using a set of definitions of concepts, their properties, relations between them, and logical constraints that are expected to hold. Logic built into such a model allows us to reason about a graph and information contained within, and to make implicit information in the graph explicitly accessible.

Knowledge graphs consolidate and integrate an organization's information assets and make them more readily available to all members of the organization. There are many applications and use cases that are enabled by knowledge graphs. Information from disparate data sources can be linked and made accessible to answer questions you may not even have thought of yet. Information and entities can be extracted not only from structured sources (e.g., relational databases) but also from semi-structured sources (e.g., media metadata, spreadsheets) and unstructured sources (e.g., text documents, email, news articles).

BRIEF DESCRIPTION OF DRAWINGS

Various examples in accordance with the present disclosure will be described with reference to the drawings, in which:

FIG. 2 illustrates examples of knowledge graph entities.

FIG. 3 illustrates examples of knowledge graph entities in a graph form.

DETAILED DESCRIPTION

The present disclosure relates to methods, apparatus, systems, and non-transitory computer-readable storage media for aligning knowledge graphs. Graph entity alignment is the problem of "joining" two knowledge graphs based on common entities. Most approaches in literature solve this using some annotated seed entity pairs and train a supervised model to rank entities in one knowledge base against another. This also has the side effect that unmatched entities in a source KG are forcefully matched to some or the other target entity because it is solved as a ranking problem.

Detailed herein are methods, apparatus, systems, and non-transitory computer-readable storage media, etc. for aligning knowledge graphs that do not use models to rank entities. In particular, graph entity alignment is solved in some examples in an unsupervised manner using KG-to-text summaries to encode entities in two or more distinct KGs into the same representation space. KG-to-text summaries may be generated using a rule-based approach or domain-based generation models. The summaries are then encoded and vector similarity metrics (such as cosine similarity) and thresholds are used to match entities across the two KGs if the most similar entities meet a certain threshold. If the threshold is not met, the entities do not match. This does not need annotated seed entity pairs.

Figure 1:
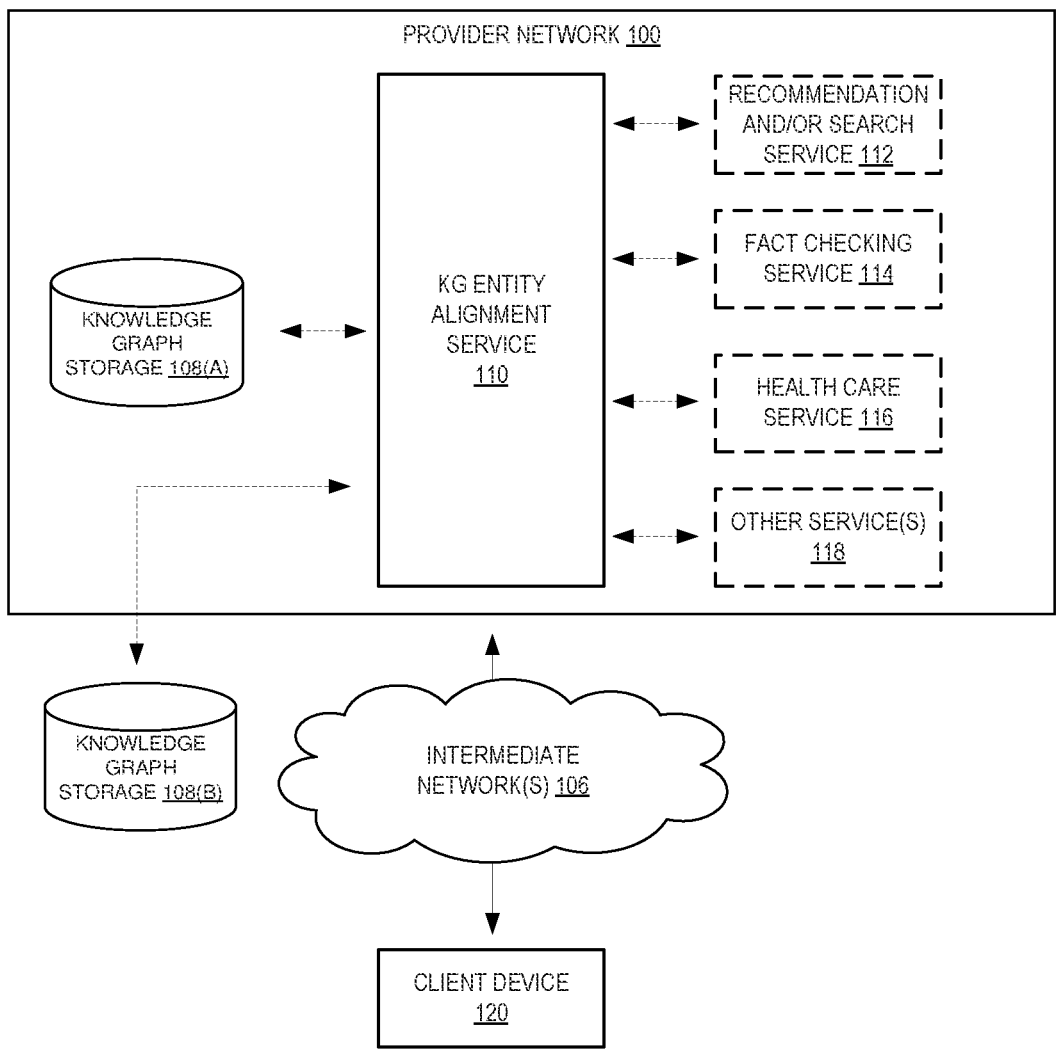
FIG. 1 illustrates examples a provider network including an entity alignment service.

FIG. 1 illustrates examples a provider network including an entity alignment service. A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

As described herein, one type of service that a provider network may provide may be referred to as a "managed compute service" that executes code or provides computing resources for its users in a managed configuration. Examples of managed compute services include, for example, an on-demand code execution service, a hardware virtualization service, a container service, or the like.

An entity alignment service 110 aligns one or more KGs (if possible). In some examples, the alignment is in response to a request from a client device 120 (e.g., via a graphical user interface or application programming interface call(s)). One or more KGs to be aligned may be stored within the provider network 100 in a knowledge graph storage 108(A) or externally to the provider network 100 in a knowledge graph storage 108(B). In some examples, the entity alignment service 100 performs graph entity alignment by generating KG-to-text summaries to encode entities in two or more distinct KGs into the same representation space, encoding the summaries, and then performing one or more similarity metrics to attempt to match entities across the KG.

The provider network 100 may also have other services that could use aligned KGs. For example, media users of the provider network 100 may want to use a recommendation and/or search service 112 may use aligned KGs for recommendations and for searching of their content. The effectiveness of aligned KGs in learning relationships between titles, sound, actors, etc. may make for a better user experience. or customers that have a dearth of interactions-based data to serve recommendations from like-minded users, an item/title-based recommendation system that exploits and learns from relationships between them (KG), become a primary way of offering recommendations. More recently, customers are exploring manual ways of merging additional metadata on their titles from data vendors to improve their recommendations, "within" catalogue and out-of-catalogue search results. The incremental benefits will be guaranteed only if the entities between customer catalogue and data vendor are matches accurately.

For example, media users of the provider network 100 may want to use a fact checking service 114 to fact check KGs in any domain. Consider the customer KG as the only source of trusted knowledge about their data. For example, this could be KG of new articles associated through common entities like person, location, organization or COVID-19 related health care KG with symptoms, cure and side effects. By extracting relevant entities from reviews and encoding them via the entity alignment service 110 a comparison and validation of if the review matches with the corresponding information in the source KG's node through similarity scores between their embeddings can be made. Unmatched ones can be flagged and can be sent for human verification for gauging "fake-ness".

For example, media users of the provider network 100 may want to use a fact checking service 114 to provide one or more of question-answering, drug recommendation, disease diagnosis and medical assistance. Unfortunately, the knowledge of medical practice is distributed across several literature sources, which makes it manually tedious to peruse them all for making informed decisions. An automated knowledge graph fusing solution through entity alignment alleviates the manual workload and enable faster medical advice, research and support applications. For example, medical practitioners can merge various data sources like electronic health records, disease literature, drug catalogue, public information databases and hospital specific information, enhancing assistance to medical practitioners.

Other service 118 may also use aligned KGs such as industry specific academic and research organizations merge knowledge graphs of publications and articles from different journals to find articles that are closest to their query.

FIG. 2 illustrates examples of knowledge graph entities. In particular, an entity from knowledge graph 1 201 and two entities from knowledge graph 2 (entity 203 and entity 205) are shown. In these examples, the KGs concern at least books. As shown in this figure, KGs may not completely overlap. For example, the entity from knowledge graph 1 201 uses keywords and the entity from knowledge graph 2 203 uses tags. The entity from knowledge graph 2 203 does not have publisher information. Also, how the author is notated is different. The entity from knowledge graph 2 205 is unrelated to the other entities. As such, this entity 205 should not be merged with those entities.

FIG. 3 illustrates examples of knowledge graph entities in a graph form. Each of the entities from FIG. 2 (entities 201 and 203) includes a plurality of nodes and their respective features. Nodes are connected by edges. Note that other nodes, node types, etc. may be used and that this is merely illustrative.

Figure 4:
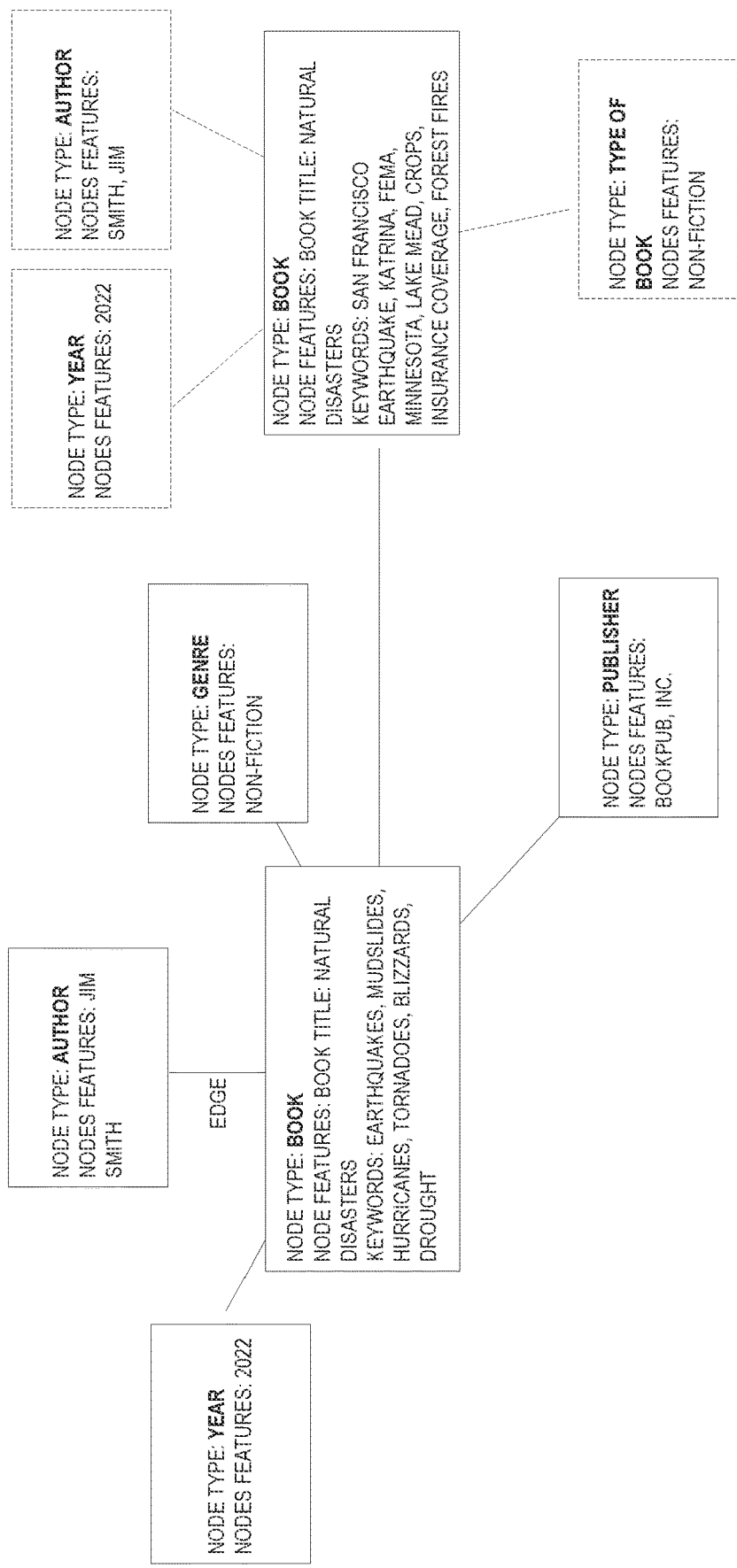
FIG. 4 illustrates examples of knowledge graph entities in a graph form that are aligned or merged.

FIG. 4 illustrates examples of knowledge graph entities in a graph form that are aligned or merged. In some examples, duplicative information is not included (as indicated by the dashed boxes). This would be the output (although not necessarily in graph form) from the entity alignment service 110.

Figure 5:
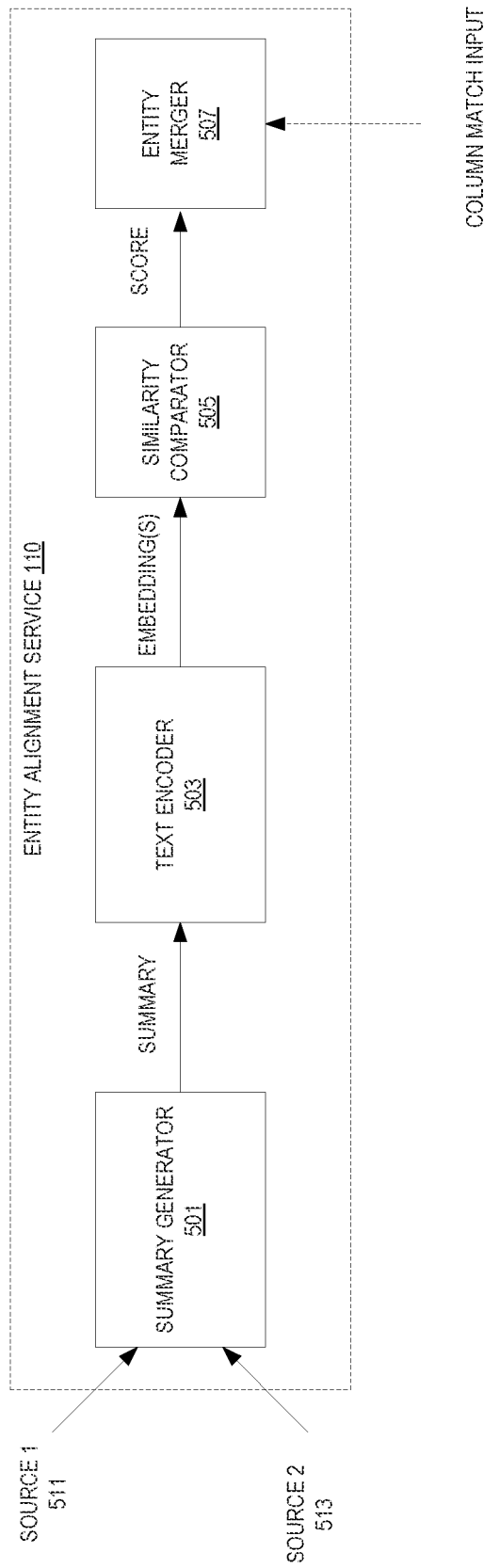
FIG. 5 illustrates embodiments of an entity alignment service.

FIG. 5 illustrates embodiments of an entity alignment service such as entity alignment service 110. As shown, at least two KG sources (source 1 511 and source 2 513) are provided to a summary generator 501 which generates (natural language) summaries of entities of the KG sources. In some examples, the summary generator 501 uses template-based matching to generate summaries from entities in each knowledge graph along with their features and relations. In particular, the entities, features, and relations, are translated into sentences that adhere to a template. For example, a template (TG) may look like "The <genre_name> genre book <book_title> by <author> was published in <publication_year> and can be described using keywords like <keywords>." The template may be provided by a user as a part of a request, linked to as a part of a request, or provided by the provider network 100.

In some examples, instead of using a defined template to generate texts from entities, a language model (M) generates a summary text from entity data in an automated fashion. To achieve this, in some examples, a natural language generation model is trained to take in entity properties and relationships from a table as key value inputs (column, value) and outputs a text that summarizes the information in the table.

Figure 6:
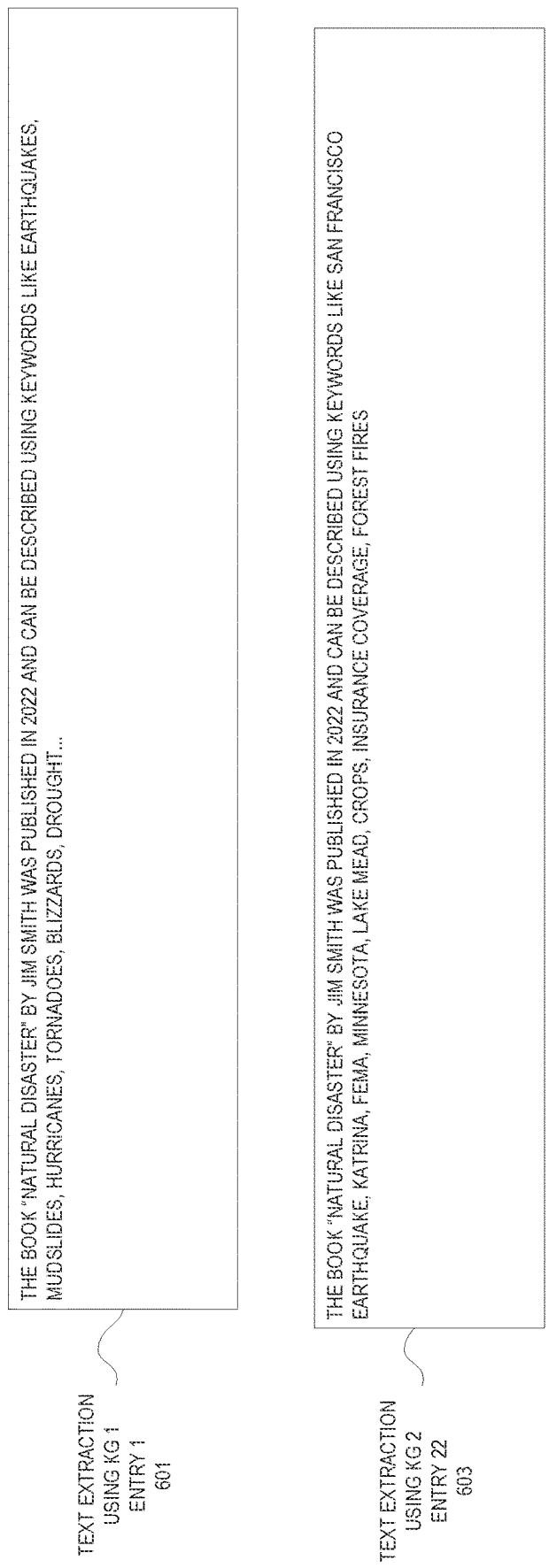
FIG. 6 illustrates examples of summaries.

FIG. 6 illustrates examples of summaries (as extracted text). In this example, the template approach as been used to provide a summary 601 of the text from KG 1 and a summary 603 of the text from KG 2.

After the summaries have been generated, a text encoder 503 encodes the summaries into embeddings. In some examples, the text encoder 503 is a language model. This language model (LM) is typically trained on a large corpus. In some examples, the embeddings are obtained from a hidden representation of the LM's encoder (assuming a standard Transformer model architecture). Note that the same text encoder 503 is used for summaries for both KGs to ensures that the entities from both the graphs are encoded into the same latent space. In some examples, the hidden state of the first token (e.g., CLS) is used as it captures the sentence level information. In some examples, mean pooling is used to return the average of all the hidden states in the encoder.

The embeddings from both the graphs are then compared based on their similarity score to check for matches using a similarity comparator 505. In some examples, a cosine similarity metric is used to compute the extent to which two sentence embeddings from two different KG entities are similar. A threshold for the metric is applied to decide if the entities are similar when the similarity score is at or above the threshold. The entities are dissimilar if the similarity score is below the threshold.

Similar entities are then merged using entity merger 507. In some examples, the merger removes content that is the same between entities. The entity merger 507 may also receive input on how to merge, for example, the entity merger 507 may receive indications about one or more of which columns match between KGs, which columns to not merge, which columns to merge, etc.

In some examples, the approach of the as entity alignment service 110 can be described with the following equations in order, where i represents entities from knowledge graphs SOURCE1 and SOURCE2, TG is a template used with each entity to generate a Summary for the entity, LMenc is a language model used to generate an embedding from a Summary, and Sim is a similarity score function to generate a similarity score between two embeddings:

$$i \in \text{Entities}\{SOURCE1, SOURCE2\}$$

$$TG(entity_i) = Summary_i$$

$$LM_{enc}(Summary_i) = embedding_i$$

$$Sim(embedding_{source1}, embedding_{source2}) = score$$

In some examples, the approach of the as entity alignment service 110 can be described with the following equations in order, where i represents entities from knowledge graphs SOURCE1 and SOURCE2, M is a model used to generate a Summary for an entity based on column (c), value (v) pairs, LMenc is a language model used to generate an embedding from a Summary, and Sim is a similarity score function to generate a similarity score between two embeddings:

$$i \in \text{Entities}(SOURCE1, SOURCE2)$$

$$M((c_1, c_2, \ldots c_n), (v_1, v_2, \ldots v_n)) = Summary$$

$$LM_{enc}(Summary_i) = embedding_i$$

$$Sim(embedding_{source1}, embedding_{source2}) = score$$

Figure 7:
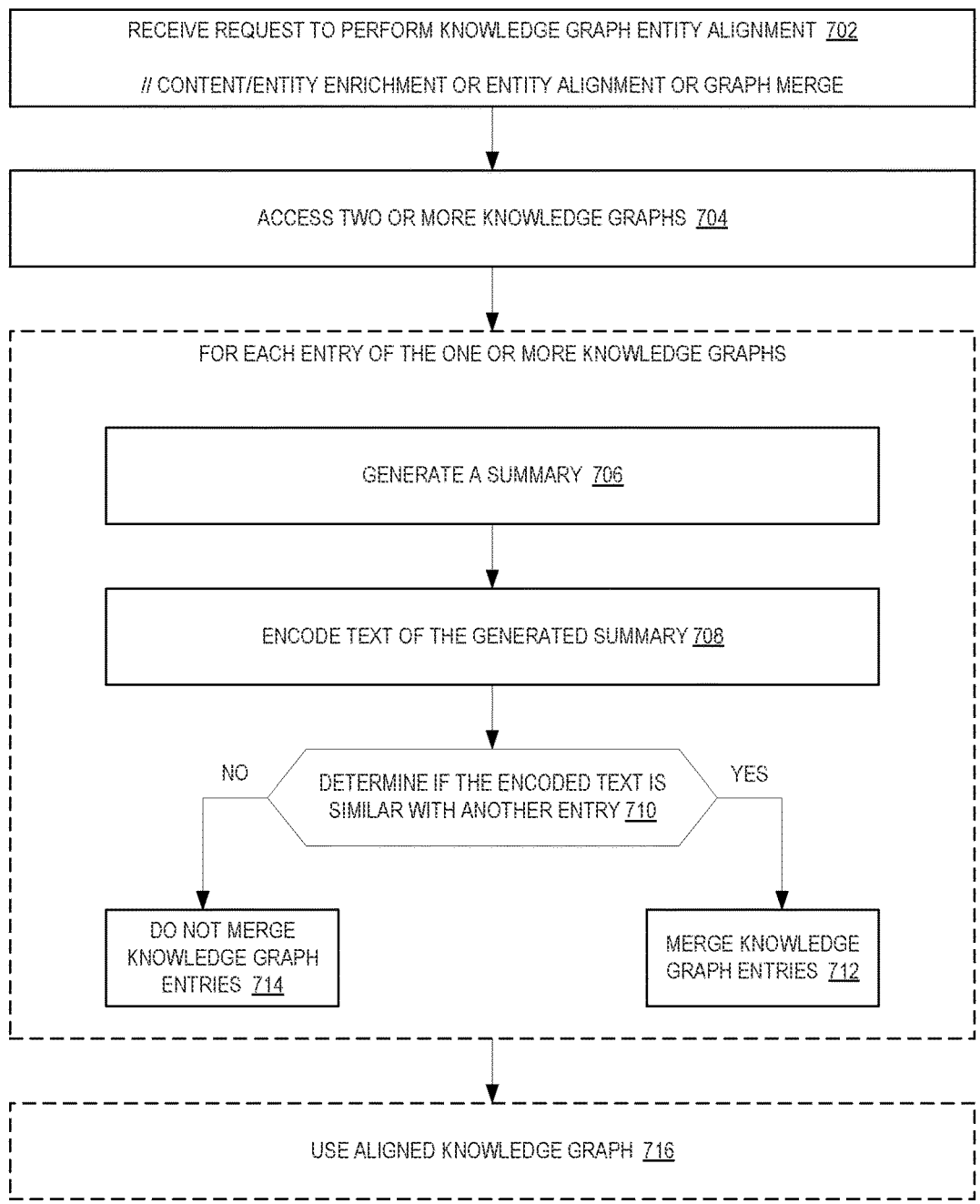
FIG. 7 is a flow diagram illustrating operations of a method for at least aligning knowledge graph entities according to some examples.

FIG. 7 is a flow diagram illustrating operations of a method for at least aligning knowledge graph entities according to some examples. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by the entity alignment service 110 of the other figures.

A request to perform knowledge graph entity alignment is received at 702. In some examples, the request includes one or more of a location of each KG to potentially align, the model to explain, one or more KGs to potentially align, a threshold value to use for determining when entities are sufficiently similar, a location of where to store an aligned KG, an indication of a technique of how entity summaries are to be generated, an indication of a language model to use to encode entity summaries, a summary template, a location of a summary template, etc.

Two or more knowledge graphs are accessed, if not included with the request at 704. For example, two or more KGs that are referenced by the request may be retrieved from KG storage 108(A) or (B).

For each entity of the one or more knowledge graphs, a plurality acts are performed. At 706 a summary is generated for each entity. As noted above, in some examples this is performed using a template or language model. The summaries are in a natural language form.

Text of the generated summaries is encoded at 708. For example, a language model is used to generate embeddings for the generated summaries.

A determination of if the encoded text between KGs is similar to another entry is made at 710. For example, encoded text from the first KG is similar to encoded text of the second KG. This determination may be made using a similarity metric such as cosine similarity. Note that this may entail generating scores for a plurality of embedding combinations such as embedding 1 of KG 1 with embeddings 1–N of KG 2, etc. In some examples, the score(s) are applied to a threshold to determine when there is sufficient similarity. Note that determining similarity to another entry may be a determining similarity within the same KG which would allow for automated cleanup of a KG.

When entities are determined to be similar, those knowledge graph entries are merged to be a part of an aligned KG at 712. When entities are determined to not be similar, those knowledge graph entries are not merged knowledge graph entries at 714. Note that merging of entities generates an aligned KG.

In some examples, the aligned knowledge graph is used at 716. Examples of services that could use the aligned KG are detailed above.

Figure 8:
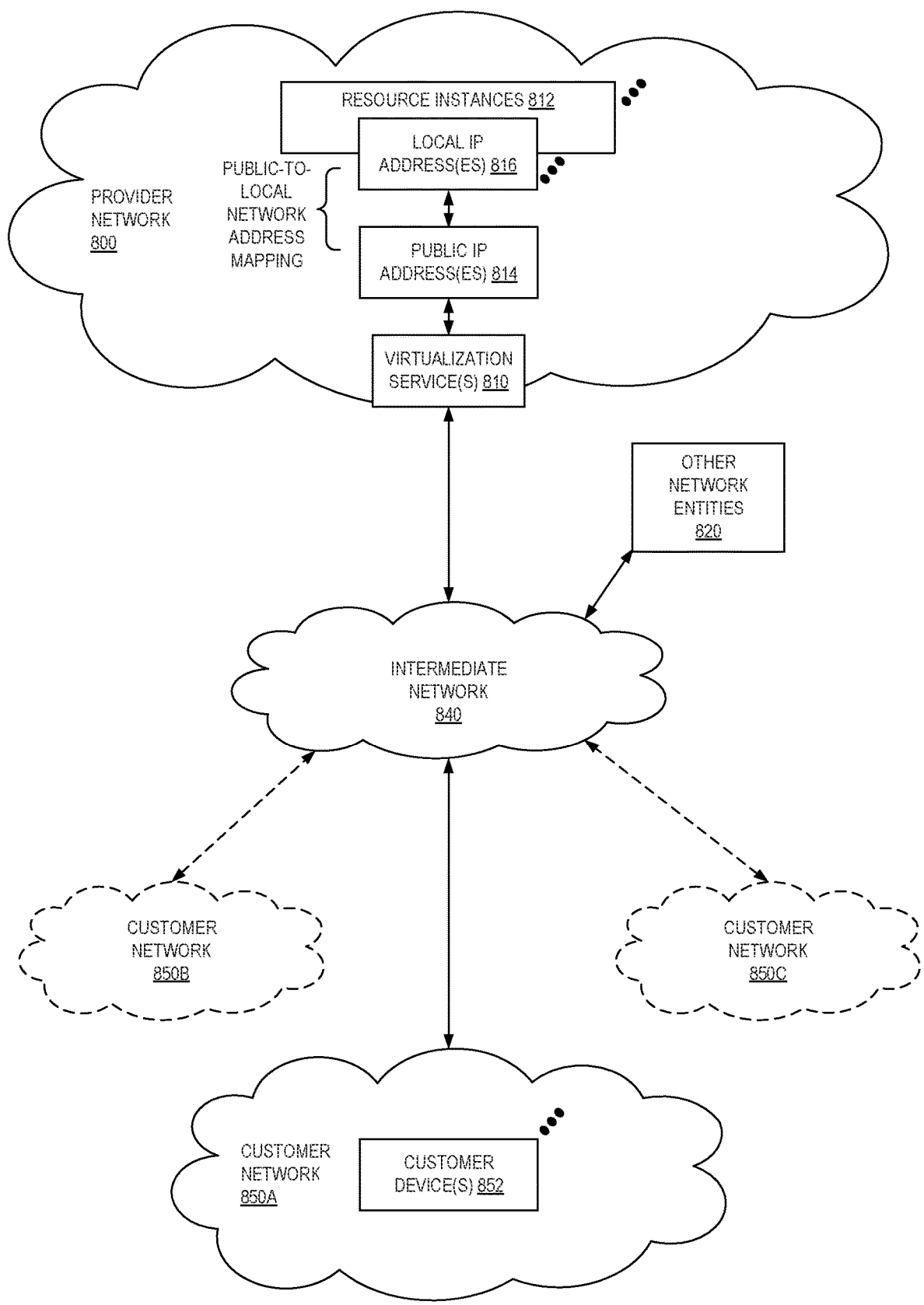
FIG. 8 illustrates an example provider network environment according to some examples.

FIG. 8 illustrates an example provider network (or "service provider system") environment according to some examples. A provider network 800 can provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 can be associated with the resource instances 812; the local IP addresses are the internal network addresses of the resource instances 812 on the provider network 800. In some examples, the provider network 800 can also provide public IP addresses 814 and/or public IP address ranges (e.g., Internet Protocol version 4 (IPv4) or Internet Protocol version 6 (IPv6) addresses) that customers can obtain from the provider 800.

Conventionally, the provider network 800, via the virtualization services 810, can allow a customer of the service provider (e.g., a customer that operates one or more customer networks 850A-850C (or "client networks") including one or more customer device(s) 852) to dynamically associate at least some public IP addresses 814 assigned or allocated to the customer with particular resource instances 812 assigned to the customer. The provider network 800 can also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of the customer network(s) 850A-850C can, for example, implement customer-specific applications and present the customer's applications on an intermediate network 840, such as the Internet. Other network entities 820 on the intermediate network 840 can then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 can be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 800; a customer can then assign their allocated public IP addresses to particular resource instances allocated to the customer. These public IP addresses can be referred to as customer public IP addresses, or simply customer IP addresses. Instead of being assigned by the provider network 800 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
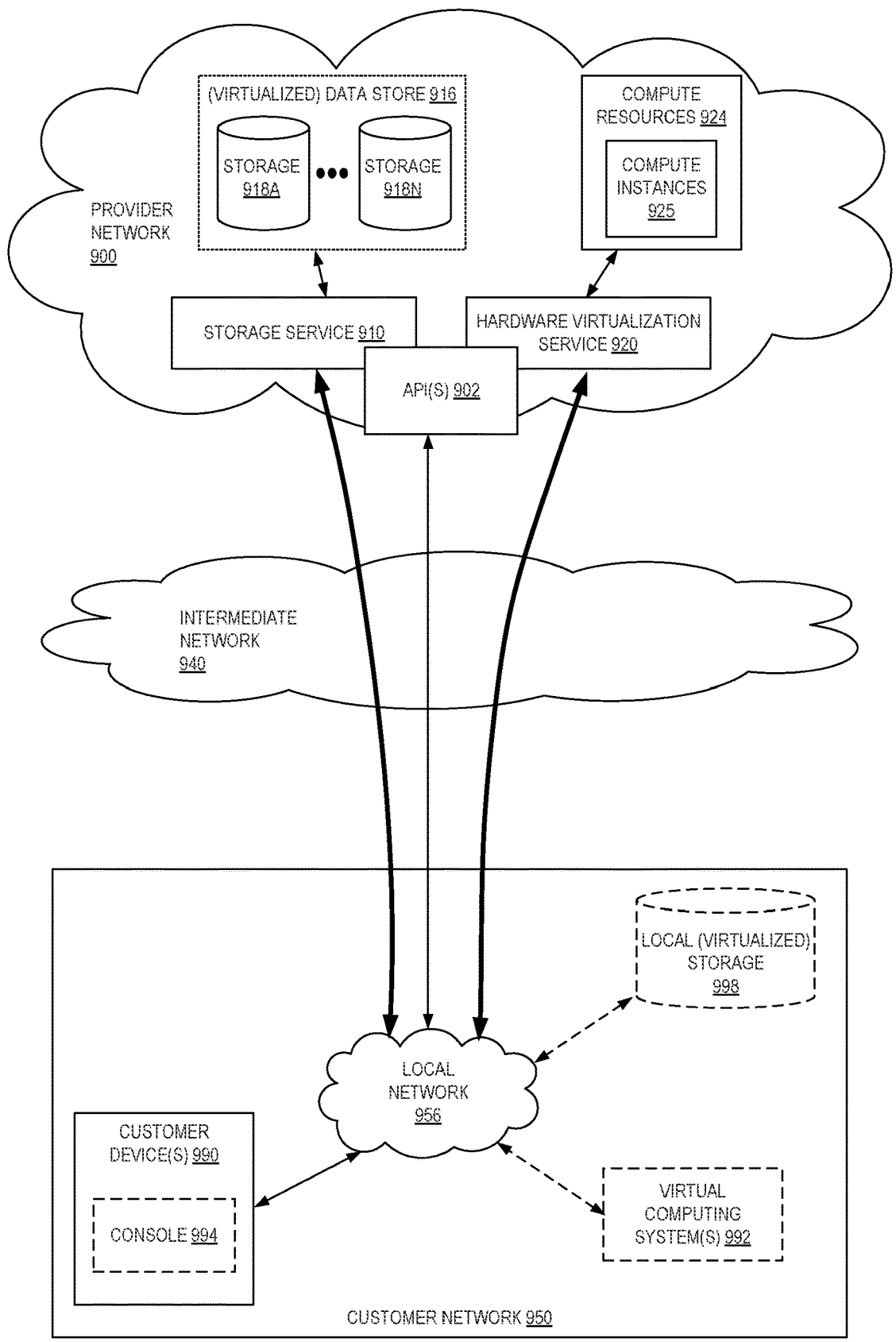
FIG. 9 is a block diagram of an example provider network that provides a storage service and a hardware virtualization service to customers according to some examples.

FIG. 9 is a block diagram of an example provider network environment that provides a storage service and a hardware virtualization service to customers, according to some examples. A hardware virtualization service 920 provides multiple compute resources 924 (e.g., compute instances 925, such as VMs) to customers. The compute resources 924 can, for example, be provided as a service to customers of a provider network 900 (e.g., to a customer that implements a customer network 950). Each computation resource 924 can be provided with one or more local IP addresses. The provider network 900 can be configured to route packets from the local IP addresses of the compute resources 924 to public Internet destinations, and from public Internet sources to the local IP addresses of the compute resources 924.

The provider network 900 can provide the customer network 950, for example coupled to an intermediate network 940 via a local network 956, the ability to implement virtual computing systems 992 via the hardware virtualization service 920 coupled to the intermediate network 940 and to the provider network 900. In some examples, the hardware virtualization service 920 can provide one or more APIs 902, for example a web services interface, via which the customer network 950 can access functionality provided by the hardware virtualization service 920, for example via a console 994 (e.g., a web-based application, standalone application, mobile application, etc.) of a customer device 990. In some examples, at the provider network 900, each virtual computing system 992 at the customer network 950 can correspond to a computation resource 924 that is leased, rented, or otherwise provided to the customer network 950.

From an instance of the virtual computing system(s) 992 and/or another customer device 990 (e.g., via console 994), the customer can access the functionality of a storage service 910, for example via the one or more APIs 902, to access data from and store data to storage resources 918A-918N of a virtual data store 916 (e.g., a folder or "bucket," a virtualized volume, a database, etc.) provided by the provider network 900. In some examples, a virtualized data store gateway (not shown) can be provided at the customer network 950 that can locally cache at least some data, for example frequently accessed or critical data, and that can communicate with the storage service 910 via one or more communications channels to upload new or modified data from a local cache so that the primary store of data (the virtualized data store 916) is maintained. In some examples, a user, via the virtual computing system 992 and/or another customer device 990, can mount and access virtual data store 916 volumes via the storage service 910 acting as a storage virtualization service, and these volumes can appear to the user as local (virtualized) storage 998.

While not shown in FIG. 9, the virtualization service(s) can also be accessed from resource instances within the provider network 900 via the API(s) 902. For example, a customer, appliance service provider, or other entity can access a virtualization service from within a respective virtual network on the provider network 900 via the API(s) 902 to request allocation of one or more resource instances within the virtual network or within another virtual network.

Illustrative Systems

Figure 10:
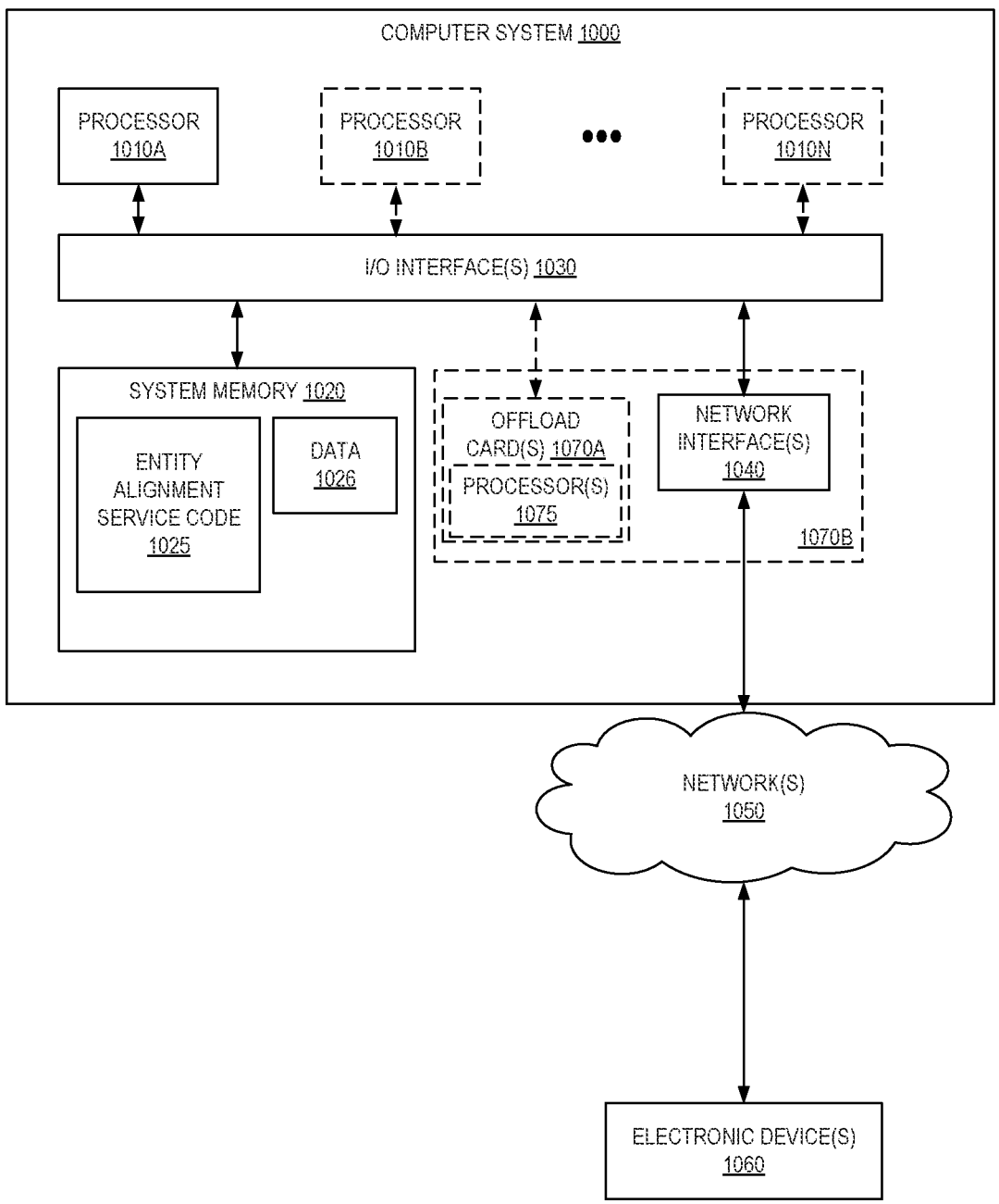
FIG. 10 is a block diagram illustrating an example computer system that can be used in some examples.

In some examples, a system that implements a portion or all of the techniques described herein can include a general-purpose computer system, such as the computer system 1000 illustrated in FIG. 10, that includes, or is configured to access, one or more computer-accessible media. In the illustrated example, the computer system 1000 includes one or more processors 1010 coupled to a system memory 1020 via an input/output (I/O) interface 1030. The computer system 1000 further includes a network interface 1040 coupled to the I/O interface 1030. While FIG. 10 shows the computer system 1000 as a single computing device, in various examples the computer system 1000 can include one computing device or any number of computing devices configured to work together as a single computer system 1000.

In various examples, the computer system 1000 can be a uniprocessor system including one processor 1010, or a multiprocessor system including several processors 1010 (e.g., two, four, eight, or another suitable number). The processor(s) 1010 can be any suitable processor(s) capable of executing instructions. For example, in various examples, the processor(s) 1010 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1010 can commonly, but not necessarily, implement the same ISA.

The system memory 1020 can store instructions and data accessible by the processor(s) 1010. In various examples, the system memory 1020 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1020 as entity alignment service code 1025 (e.g., executable to implement, in whole or in part, the entity alignment service 110) and data 1026.

In some examples, the I/O interface 1030 can be configured to coordinate I/O traffic between the processor 1010, the system memory 1020, and any peripheral devices in the device, including the network interface 1040 and/or other peripheral interfaces (not shown). In some examples, the I/O interface 1030 can perform any necessary protocol, timing, or other data transformations to convert data signals from one component (e.g., the system memory 1020) into a format suitable for use by another component (e.g., the processor 1010). In some examples, the I/O interface 1030 can include support for devices attached through various types of peripheral buses, such as a variant of the Peripheral Component Interconnect (PCI) bus standard or the Universal Serial Bus (USB) standard, for example. In some examples, the function of the I/O interface 1030 can be split into two or more separate components, such as a north bridge and a south bridge, for example. Also, in some examples, some or all of the functionality of the I/O interface 1030, such as an interface to the system memory 1020, can be incorporated directly into the processor 1010.

The network interface 1040 can be configured to allow data to be exchanged between the computer system 1000 and other devices 1060 attached to a network or networks 1050, such as other computer systems or devices as illustrated in FIG. 1, for example. In various examples, the network interface 1040 can support communication via any suitable wired or wireless general data networks, such as types of Ethernet network, for example. Additionally, the network interface 1040 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1000 includes one or more offload cards 1070A or 1070B (including one or more processors 1075, and possibly including the one or more network interfaces 1040) that are connected using the I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1000 can act as a host electronic device (e.g., operating as part of a hardware virtualization service) that hosts compute resources such as compute instances, and the one or more offload cards 1070A or 1070B execute a virtualization manager that can manage compute instances that execute on the host electronic device. As an example, in some examples the offload card(s) 1070A or 1070B can perform compute instance management operations, such as pausing and/or un-pausing compute instances, launching and/or terminating compute instances, performing memory transfer/copying operations, etc. These management operations can, in some examples, be performed by the offload card(s) 1070A or 1070B in coordination with a hypervisor (e.g., upon a request from a hypervisor) that is executed by the other processors 1010A-1010N of the computer system 1000. However, in some examples the virtualization manager implemented by the offload card(s) 1070A or 1070B can accommodate requests from other entities (e.g., from compute instances themselves), and cannot coordinate with (or service) any separate hypervisor.

In some examples, the system memory 1020 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1000 via the I/O interface 1030. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1000 as the system memory 1020 or another type of memory. Further, a computer-accessible medium can include transmission media or signals such as electrical, electromagnetic, or digital signals, conveyed via a communication medium such as a network and/or a wireless link, such as can be implemented via the network interface 1040.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
   receiving a request to perform knowledge graph entity alignment for at least two knowledge graphs (KGs);
   accessing the at least two KGs;
   for each entity of the at least two KGs, generating a summary, and
encoding text of the generated summary into an embedding;
determining that encoded text is similar between at least one entity of each of the at least two KGs; and
merging the similar at least one entity of each of the at least two knowledge graphs to generate an aligned entity.

2. The computer-implemented method of claim 1, wherein at least one of the at least two knowledge graphs is stored by a storage service of a provider network.

3. The computer-implemented method of claim 1, wherein the request includes one or more of a location of each knowledge graph (KG) to potentially align, a model to explain, one or more KGs to potentially align, a threshold value to use for determining when entities are sufficiently similar, a location of where to store an aligned KG, an indication of a technique of how entity summaries are to be generated, an indication of a language model to use to encode entity summaries, a summary template, or a location of a summary template.

4. A computer-implemented method comprising:
for each entity of at least two knowledge graphs (KGs),
generating a summary, and
encoding text of the generated summary into an embedding;
determining that encoded text is similar between at least one entity of each of the at least two KGs; and
merging the similar at least one entity of each of the at least two KGs to generate an aligned entity of an aligned knowledge graph.

5. The computer-implemented method of claim 4, wherein generating a summary is based at least in part on a natural language summary template.

6. The computer-implemented method of claim 4, wherein generating a summary is performed using a language model.

7. The computer-implemented method of claim 4, wherein each summary is in a natural language format.

8. The computer-implemented method of claim 4, wherein encoding text of the generated summaries into embeddings is performed using a Transformer-based language model.

9. The computer-implemented method of claim 8, wherein the embeddings are returned from a hidden state of a CLS token.

10. The computer-implemented method of claim 8, wherein the embeddings are returned from an average of hidden states of an encoder of the Transformer-based language model.

11. The computer-implemented method of claim 4, wherein determining that encoded text is similar between at least one entity of each of the at least two knowledge graphs is performed using cosine similarity.

12. The computer-implemented method of claim 4, wherein at least one of the at least two knowledge graphs is stored by a storage service of a provider network.

13. The computer-implemented method of claim 4, further comprising:
receiving a request that includes one or more of a location of each knowledge graph (KG) to potentially align, a model to explain, one or more KGs to potentially align, a threshold value to use for determining when entities are sufficiently similar, a location of where to store an aligned KG, an indication of a technique of how entity summaries are to be generated, an indication of a language model to use to encode entity summaries, a summary template, or a location of a summary template.

14. The computer-implemented method of claim 4, further comprising:
performing one or more actions using the aligned knowledge graph using one or more services of a provider network.

15. A system comprising:
a first one or more electronic devices to implement a storage service in a multi-tenant provider network to store at least two knowledge graphs (KGs); and
a second one or more electronic devices to implement a knowledge graph (KG) alignment service in the multi-tenant provider network, the KG alignment service including instructions that upon execution cause the KG alignment service to:
for each entity of the at least two KGs,
generate a summary, and
encode text of the generated summary into an embedding;
determine that encoded text is similar between at least one entity of each of the at least two knowledge graphs, and
merge the similar at least one entity of each of the at least two knowledge graphs to generate an aligned entity of an aligned knowledge graph.

16. The system of claim 15, wherein the summary is based at least in part on a natural language summary template.

17. The system of claim 15, wherein each summary is in a natural language format.

18. The system of claim 15, wherein the KG alignment service is further to receive a request that includes one or more of a location of each KG to potentially align, a model to explain, one or more KGs to potentially align, a threshold value to use for determining when entities are sufficiently similar, a location of where to store an aligned KG, an indication of a technique of how entity summaries are to be generated, an indication of a language model to use to encode entity summaries, a summary template, or a location of a summary template.

19. The system of claim 15, further comprising:
a recommendation service to utilize merged KGs.

20. The system of claim 15, further comprising:
a health care service to utilize merged KGs.

* * * * *